US007403778B2

(12) United States Patent
Reynolds

(10) Patent No.: US 7,403,778 B2
(45) **Date of Patent: *Jul. 22, 2008**

(54) SYSTEM AND METHOD FOR CONTROLLING HANDOVER

(75) Inventor: Paul Reynolds, Bristol (GB)

(73) Assignee: Orange Personal Communications Services Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/595,527

(22) Filed: Nov. 9, 2006

(65) Prior Publication Data

US 2007/0117564 A1 May 24, 2007

Related U.S. Application Data

(63) Continuation of application No. 10/182,941, filed as application No. PCT/GB01/00424 on Feb. 1, 2001, now Pat. No. 7,149,524.

(30) Foreign Application Priority Data

Feb. 3, 2000 (GB) ................................ 0002495.0

(51) Int. Cl.
*H04Q 7/20* (2006.01)

(52) U.S. Cl. .................... 455/436; 455/425; 455/550.1; 370/331

(58) Field of Classification Search ... 455/432.1–432.2, 455/435.1–435.3, 436–444, 418–420, 425, 455/550.1–553, 524–525, 517; 370/320, 370/321, 328–329, 331–339
See application file for complete search history.

(56) References Cited

U.S. PATENT DOCUMENTS 5,497,504 A * 3/1996 Acampora et al. .......... 455/436
5,657,375 A * 8/1997 Connolly et al. ............ 455/436
5,805,993 A 9/1998 Cherpantier et al.
5,889,953 A * 3/1999 Thebaut et al. ............. 709/221
6,275,703 B1 8/2001 Kalev
6,363,431 B1 * 3/2002 Hammer et al. ............. 709/249

(Continued)

FOREIGN PATENT DOCUMENTS

EP 0 768 805 A1 4/1997

(Continued)

OTHER PUBLICATIONS

Rappaport, et al., *Prioritized Resource Assignment for Mobile Cellular Communication Systems with Mixed Services and Platform Types*, IEEE Transactions on Vehicular Technology, vol. 45, No. 3, pp. 443-458 (Aug. 1, 1996).

(Continued)

*Primary Examiner*—William Trost
*Assistant Examiner*—Kamran Afshar
(74) *Attorney, Agent, or Firm*—Knobbe Martens Olson & Bear LLP

(57) ABSTRACT

A method of, apparatus for and a computer program for controlling handover of a mobile station conducting a communications session in a mobile communications network, the network including a plurality of radio access domains, the method comprising receiving a trigger indicating a requirement for handover; testing at least one possible handover meeting said requirement against network policy; and controlling handover in accordance with said requirement and said network policy.

13 Claims, 7 Drawing Sheets

U.S. PATENT DOCUMENTS

| | | | | |
|---|---|---|---|---|
| 6,397,065 | B1 * | 5/2002 | Huusko et al. | 455/435.2 |
| 6,400,951 | B1 | 6/2002 | Vaara | |
| 6,434,387 | B1 | 8/2002 | Lee | |
| 6,567,667 | B1 * | 5/2003 | Gupta et al. | 455/445 |
| 6,643,279 | B1 * | 11/2003 | Li et al. | 370/331 |
| 6,714,987 | B1 * | 3/2004 | Amin et al. | 709/249 |
| 6,771,964 | B1 | 8/2004 | Lahtinen et al. | |
| 6,788,665 | B1 | 9/2004 | Vancraeynest | |
| 6,859,654 | B1 * | 2/2005 | Reynolds et al. | 455/437 |
| 7,215,962 | B2 * | 5/2007 | Faerber | 455/437 |
| 2002/0147008 | A1 * | 10/2002 | Kallio | 455/426 |
| 2007/0076664 | A1 * | 4/2007 | An et al. | 370/331 |

FOREIGN PATENT DOCUMENTS

| | | | |
|---|---|---|---|
| GB | 2 296 626 | | 7/1996 |
| GB | 2 332 340 | | 6/1999 |
| GB | 2 359 220 | | 8/2001 |
| WO | WO 95/31868 | A1 | 11/1995 |
| WO | WO 96/33584 | A1 | 10/1996 |
| WO | WO 98/46031 | A2 | 10/1998 |
| WO | WO 98/49858 | | 11/1998 |

OTHER PUBLICATIONS

Iera, et al., *Transport and Control Issues in Multimedia Wireless Networks*, Wireless Networks, vol. 2, No. 3, pp. 249-261 (Aug. 1, 1996).

Jeon, et al., *A Call Control Scheme for Soft Handoff in CDMA Cellular Systems*, IEEE, Vol. Conf. 5, pp. 999-1003 (Jun. 7, 1998).

International Search Report, Application No. PCT/GB 01/00424, European Patent Office, Jul. 26, 2001.

United Kingdom Search Report, Application No. GB 0102567.5, Nov. 2, 2001.

* cited by examiner

| Fig.4. | Fig.4 (Cont i). | Fig.4 (Cont ii). |
|---|---|---|

Fig.4 (Cont i).
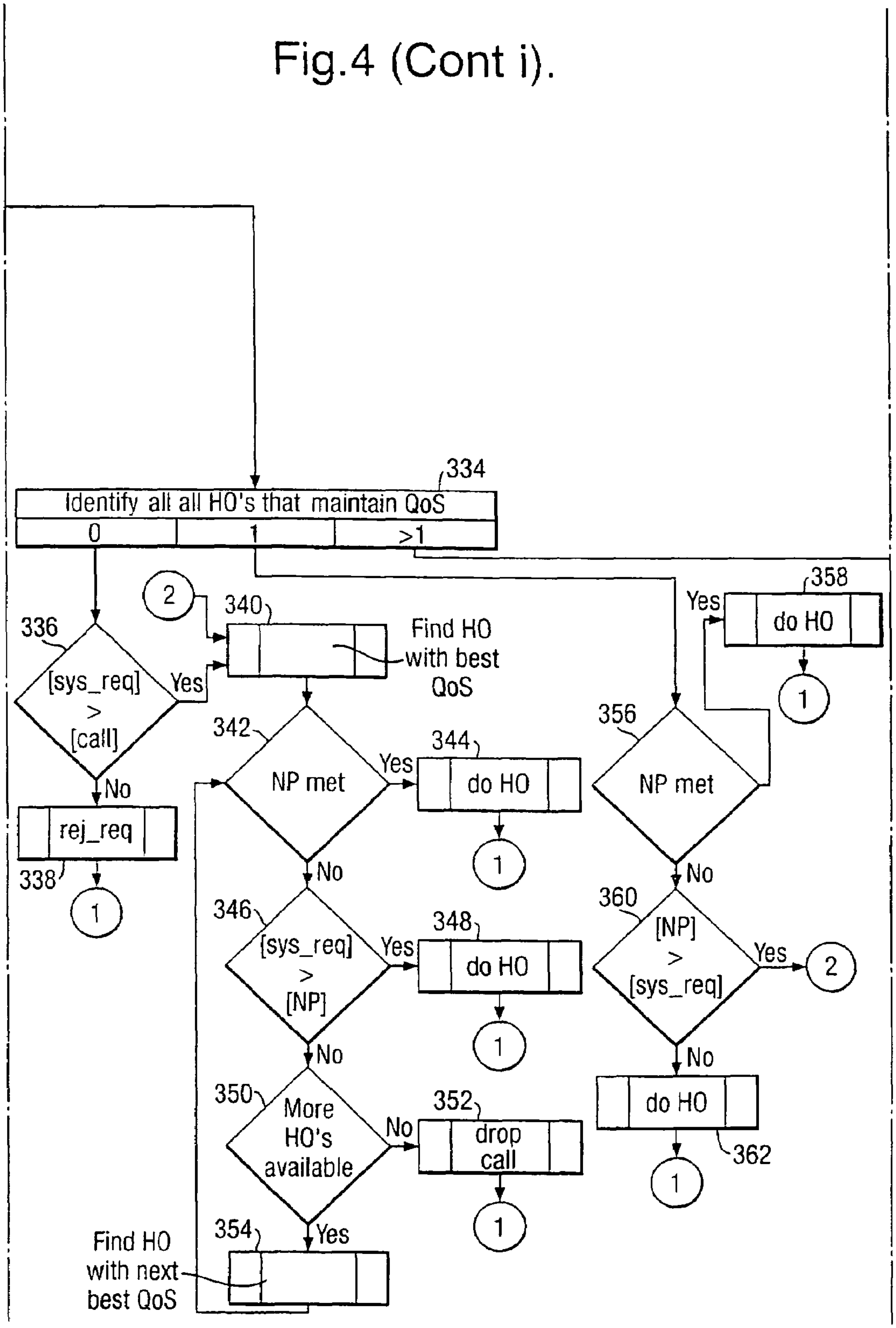

Fig.4 (Cont ii).
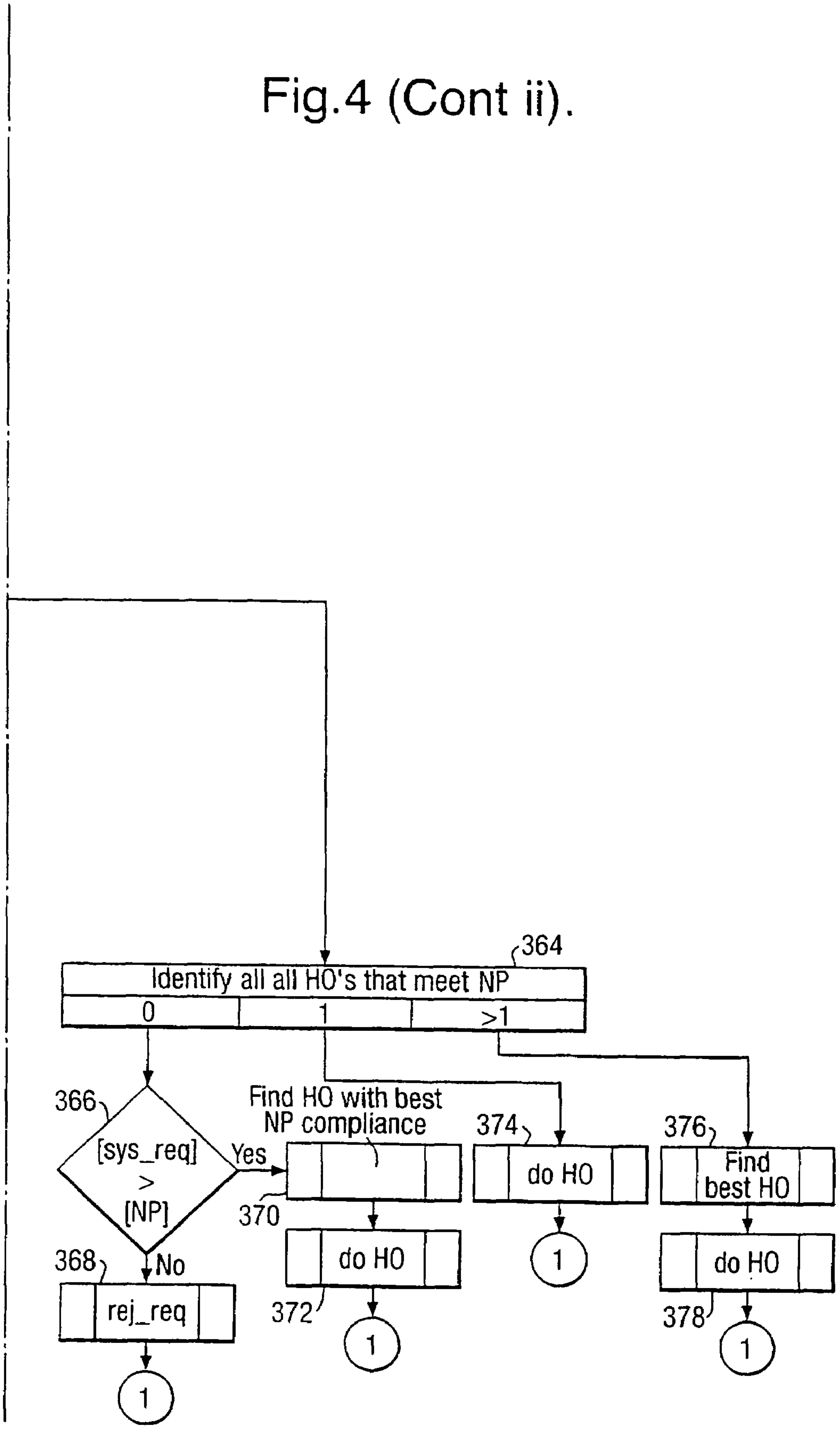

SYSTEM AND METHOD FOR CONTROLLING HANDOVER

CROSS-REFERENCE TO RELATED APPLICATIONS

This application is a continuation of U.S. application Ser. No. 10/182,941, filed Nov. 20, 2002, now U.S. Pat. No. 7,149,524 which is a National Stage Application based on International Application No. PCT/GB01/00424, filed Feb. 1, 2002 (published as WO/01/58177), which claims priority to GB 0002495.0, filed on Feb. 3, 2000. The subject matter of U.S. application Ser. No. 10/182,941 is expressly incorporated by reference herein in its entirety.

BACKGROUND OF THE INVENTION

1. Field of the Invention

This invention relates to mobile communications, and in particular to a method of controlling handover of a mobile station in a mobile communications network.

2. Description of the Related Technology

Handover algorithms are known for existing cellular wireless technologies. A cellular mobile station receiving service on uplink or downlink channels of a cell in a cellular network may experience worsening signal to noise (S/N) on the uplink and/or downlink channels, with the execution of a handover algorithm within the network resulting in a handover between channels in the cell or between different cells, to ensure a call is not dropped and to improve general quality of service during the call.

A number of different radio access technologies are proposed to be used in future to provide an appropriate level of service to the type of access a user may require at any particular time. The user's requirements may change from communications session to communications session or during a single communications session. To allow a user different types of access during a single communications session handover between the different radio access technologies may be desirable. For example, if a user requires a video conference link, a third generation radio access technology may be used. On the other hand, if only a voice call is desired, second generation radio access technologies may be sufficient. In the future heterogenous mobile environment, both nomadicity and migration of users should be supported. Thus, a user should be able to initiate a communications session using different radio access technologies and obtain delivery of a service while roaming between radio access technologies (nomadicity). Furthermore, handovers between radio access technologies should also be supported while the user is actively engaged in a communications session (migration). Examples of such handovers are between a second generation public GSM network, a third generation public Wideband Code-Division Multiple Access (W-CDMA) network and a wireless local area network (WLAN).

SUMMARY OF CERTAIN INVENTIVE ASPECTS

In accordance with the present invention there is provided a method of controlling handover of a mobile station conducting a communications session in a mobile communications network, the network including a plurality of radio access domains, the method comprising:

receiving a trigger indicating a requirement for handover;

testing at least one possible handover meeting said requirement against network policy; and controlling handover in accordance with said requirement and said network policy.

Further aspect of the present invention are set out in the appended claims.

BRIEF DESCRIPTION OF THE DRAWINGS

Features and advantages of the invention will become apparent from the following description of preferred embodiments of the invention, which will now given, by way of example only, with reference to the accompanying drawings, wherein.

DETAILED DESCRIPTION OF CERTAIN INVENTIVE EMBODIMENT

Figure 1:
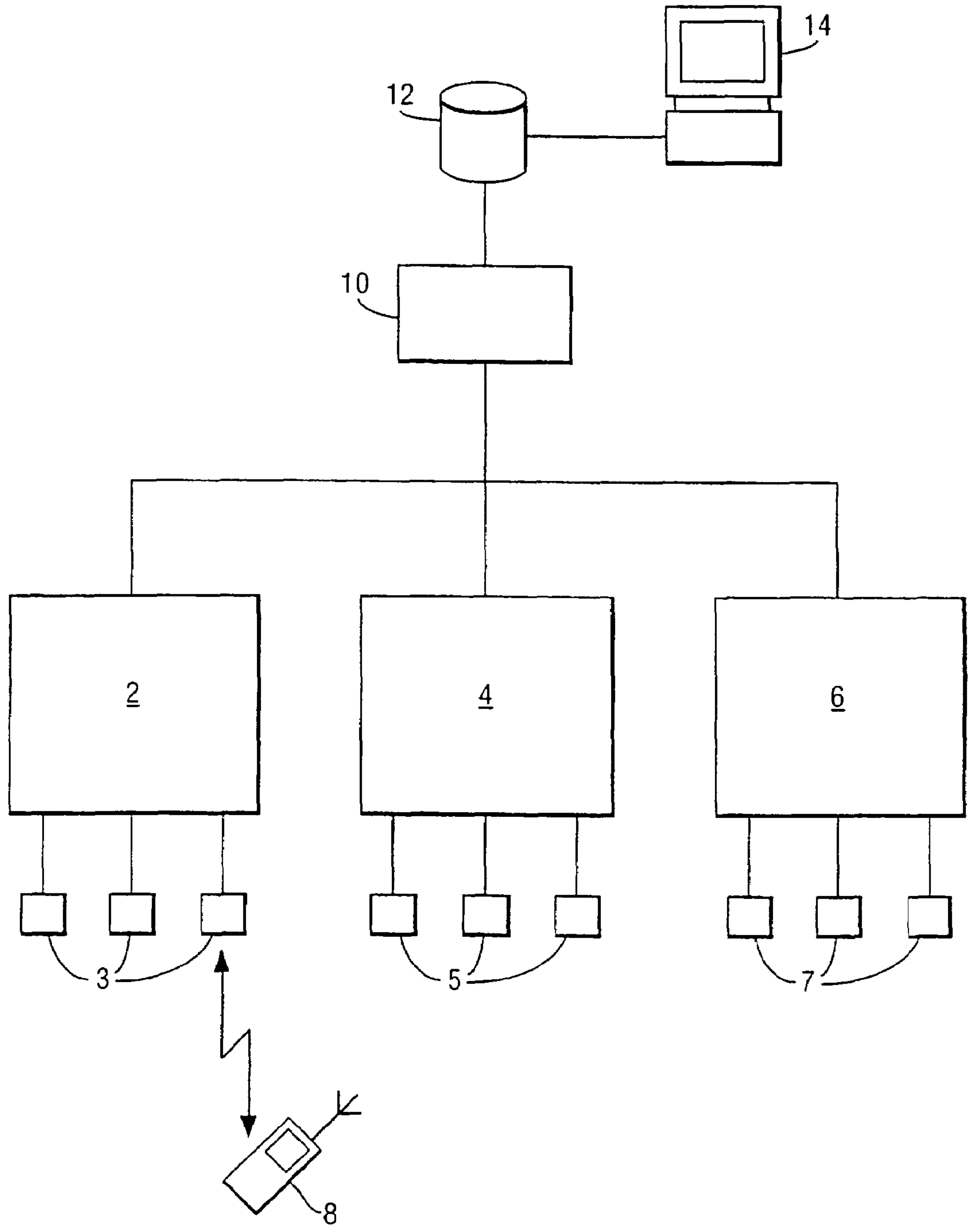
FIG. 1 is a schematic diagram of a mobile communications network arranged in accordance with an embodiment of the invention.

FIG. 1 illustrates a mobile communications network in accordance with an embodiment of the invention. The mobile communications network includes a plurality of radio access domains 2, 4, 6, which each implement different radio access technologies. In this example, a first radio access domain 2 is a second generation GSM radio access domain including GSM base transceiver stations 3, operating at frequencies of approximately 900 MHz and/or 1800 MHz. A second radio access domain 4 is a third generation W-CDMA radio access domain including W-CDMA radio access nodes 5, operating at a frequency of approximately 2 GHz. A third radio access domain 6 is a wireless LAN access domain including wireless LAN radio access nodes 7, which may operate at frequencies anywhere between 2 to 60 GHz A mobile station 3, in accordance with this invention, is capable of communicating via each of the radio access domains 2, 4, 6, via the respective access nodes 3, 5, 7. For example the mobile station may be a laptop computer with three different radio access technology plug-in cards, or a mobile handset with appropriate three-band functionality in-built, which allow the mobile station to be used to access GSM, W-CDMA and WLAN domains and attach to a domain which is best suited to the requirements of the terminal at any particular time. The mobile station may also include an inter-working function to allow a substantially seamless handover between the different domains during a communications session. It is to be understood that while different radio access domains implement different radio access technologies, a single physical access node may serve one or more of these radio access technologies and, thus, changing radio access domain for a mobile station will not necessarily require changing radio access node.

The radio access domains 2, 4, 6, each implement known intra-network handover schemes, whereby the service provided by each radio access domain separately is maintained during mobility of the mobile station within the coverage of the radio access domain.

The mobile communications network also includes a handover manager 10 which is hierarchically above the individual radio access domains 2, 4, 6 in the network architecture. The handover manager 10 manages inter-domain handovers between the radio access domains 2, 4, 6, in accordance with handover triggers received during the handling of a communications session conducted by a mobile station 8. The handover manager may consist of a single service node, or plural nodes, capable of handling inter-domain handovers for all mobile stations connected to the mobile communications network, or may be implemented in the form of a distributed object-oriented processing system in which individual handover managers, in the form of handover manager objects, control the handover functions for individual mobile stations connected to the mobile communications network. These objects may include a user agent for initiating, maintaining and terminating a virtual connection through the core network, amongst other things; a terminal agent for maintaining a mobile station "prescence" on the system whether or not the user is physically connected; a security agent for verifying that user authentication has taken place; and a handover agent for controlling the execution of handover.

The handover manager 10 receives network policy data from a handover policy server 12. In the case of the handover manager 10 being implemented in the form of a single node, or plural nodes, the data may be in the form of signalling messages sent between a handover policy server 12 and the handover manager 10. In the case of the handover manager 10 being implemented in a distributed processing environment, the network policy data may be in the form of handover policy objects passed between the handover policy server 12 and the handover manager 10.

A management terminal 14 is used to allow handover policy to be altered in the handover policy server by network administrators, whereby the control of handover by the handover manager is directly influenced in accordance with the requirements of the operator of the mobile communications system. This allows the operator to alter the results of the handover algorithm, Without altering the general scheme of the handover algorithm, thereby providing convenience and flexibility to the network operator. The operator may alter priorities to reasons for handover and factors to be considered when planning a handover.

Network policies may include: A) Minimise call cost by handing over between different radio access domains, when it is deemed appropriate, to attempt to keep the communications on the lowest possible cost domain. B) Minimise use of third generation radio access network resources, which policy may be particularly useful when such resources are scarce. Handover would be executed from the third generation domain whenever appropriate. C) Exceed the users expectations by handing over to higher quality resources which are unused, when it is deemed appropriate. D) Maximise network yield by handing over calls to radio access domains with the best earnings to operating cost ratios, whenever it is deemed appropriate. E) Give priority to certain types of users or calls by handing over those users or calls preferentially to the higher quality resources, and handing other users or calls away from those resources.

The above are all examples of many different types of network policy which may be implemented, and it will be appreciated that some policies are mutually exclusive (for example B and C above). However, by implementing these policies in a policy server and providing interfaces in the handover algorithm to the policies stored in the policy server, different inter-network handover policies may be implemented at different times.

Handover triggers are classified herein as user requests and system requests. User requests may result from the modification of user requirements during a communications session. For example, user applications may have differing requirements for security. A handover to an alternative radio access domain may be required if the current radio access domain does not meet the security requirements for a desired user application. Alternatively, the Quality of Service (QoS) requirements of a user may change as a result of a new application being used during a communications session. Further, the capabilities of the mobile station may change resulting in a need or preference for a handover. For example, the mobile station may have moved into an area of coverage of a radio access domain for which it does not hold the necessary software components, or the mobile station may have recently downloaded software components which enable it to attach to a radio access domain of preference. Thus, user requests may be signalled to the handover manager 10 from the user's mobile station, or from a user agent (e.g. a software object in a distributed processing system) operating on behalf of the user. In the case of a user currently served by a GSM network, the signalling may be achieved as described in our British Patent Publication GB 2332340. User requests may also result from new resources becoming available and matching preferences already stored in the system for the user, for example cost, service level and privacy preferences. These standing user preferences may be stored in the user agent.

System requests may result from radio access domain criteria or network criteria, such as over-congestion (i.e. reactive to existing congestion), availability (i.e. proactive to avoid potential congestion), priority being given to emergency services, QoS criteria such as to improve or maintain the signal to noise ratio or to reduce interference, forced maintenance activities, or preferences for certain types of users (for example an access domain consisting primarily of picocells may prefer slow-moving users). System requests may thus be signalled to the handover manager 10 directly from network elements within the currently-serving radio access domain or network.

The data stored in policy server 12 also defines different levels of priority to be allocated to all system requests, user requests, network policy criteria, and call types. This allows any conflict between the different requirements of users, the radio access domain, and network policy itself, to be resolved in accordance with network policy. These levels of priority are also variable by means of the management terminal 14.

The main functions of handover manager 10 on receipt of a handover request or trigger are, firstly, to obtain and compare, if necessary, information relevant to the requested handover from a variety of sources including network policy data from network policy server 12, standing user preferences, which may be maintained in a user agent, mobile station capabilities from a terminal agent and security data from a security agent. Secondly, handover manager 10 identifies the best of all potential handovers taking into account the information obtained such as user preferences and network policy. Thirdly, the handover manager instructs the execution of the best available handover, if any. The handover may be controlled by a handover agent.

Figure 2:
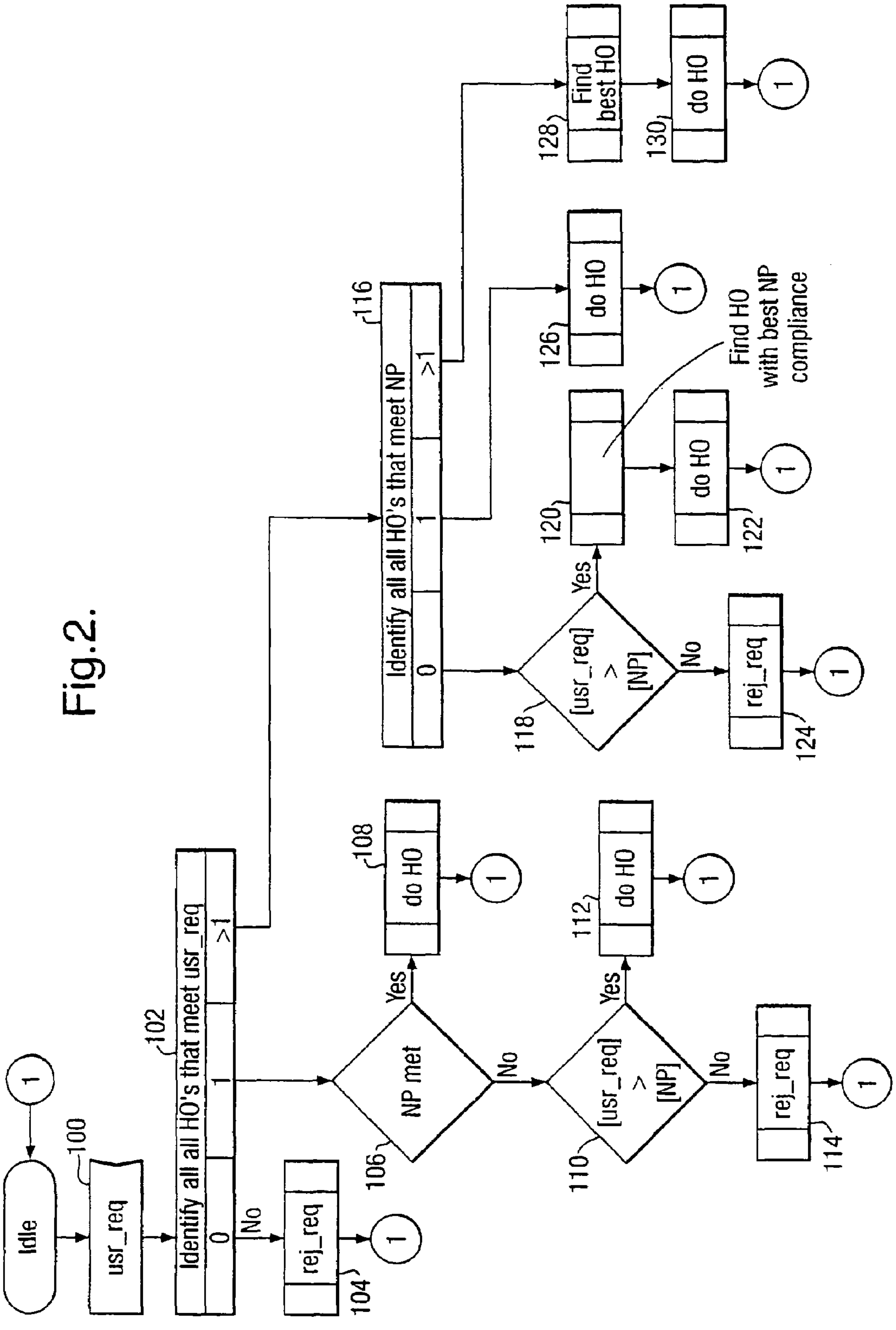
FIGS. 2 to 4 are flow diagrams illustrating handover algorithms conducted in the handover manager of the embodiment illustrated in FIG. 1.

FIG. 2 illustrates the handover algorithm executed by the handover manager 10 on receipt of a user request handover trigger, step 100. The handover manager 10 first identifies all handovers that meet the user request, along with the current minimum requirement of the user, step 102. If no handovers meet the user request, the user request is rejected, step 104. If on the other hand a single handover is currently available that meets the user request, the handover manager 10 checks that network policy is met by the handover. This checking involves the checking of predetermined characteristics of the handover which are identified in the handover policy server 12 as being of relevance to network policy, and ensuring that those characteristics do not fall outside network policy, step 106. If network policy is met by the handover meeting the user request, the handover manager 10 executes handover, step 108. If it is found that network policy is not met by the handover meeting the user request, the relative priority of the user request and network policy, or the elements of network policy not met, is checked in step 108. If the level of priority given to the user request is higher than network policy, the handover is executed in any case, step 112. On the other hand, if network policy takes precedence, the user request is rejected, step 114.

In the case that in step 102 it is found that a plurality of handovers meet the user request and the current minimum requirements of the user, the number of handovers that meet network policy is checked in step 116. If no handovers identified in step 102 also meet network policy, it is checked whether the priority given to the user request is greater than that given to network policy, step 118. If the user request takes precedence, the handover of those identified in step 102 having the best network policy compliance is selected in step 120 and handover is executed in step 122 in accordance with the selected best handover. If on the other hand in step 118 if network policy takes precedence over the user request, the user request is rejected, step 124. If in step 116 a single one of the plurality of handovers identified in step 102 is identified as meeting network policy, the handover is executed in step 126. If in step 116 a plurality of handovers of those identified in step 102 is identified as meeting network policy also, the best handover is identified in step 128. Finding the best handover in this manner allows not only the current minimum requirements of the user to be taken into account, but also a user's desired requirements. For example, it may be possible to start a video call at 28.8 Kbps although a bandwidth of 56 Kbps would be preferred. If a handover to a channel providing a bandwidth of 56 Kbps is available in step 128, this would be selected in preference to the lower bandwidth video call even though the lower bandwidth video call may be both meet the user request and network policy. Following the selection of the best handover in step 128, the selected handover is executed, step 130.

Figure 3:
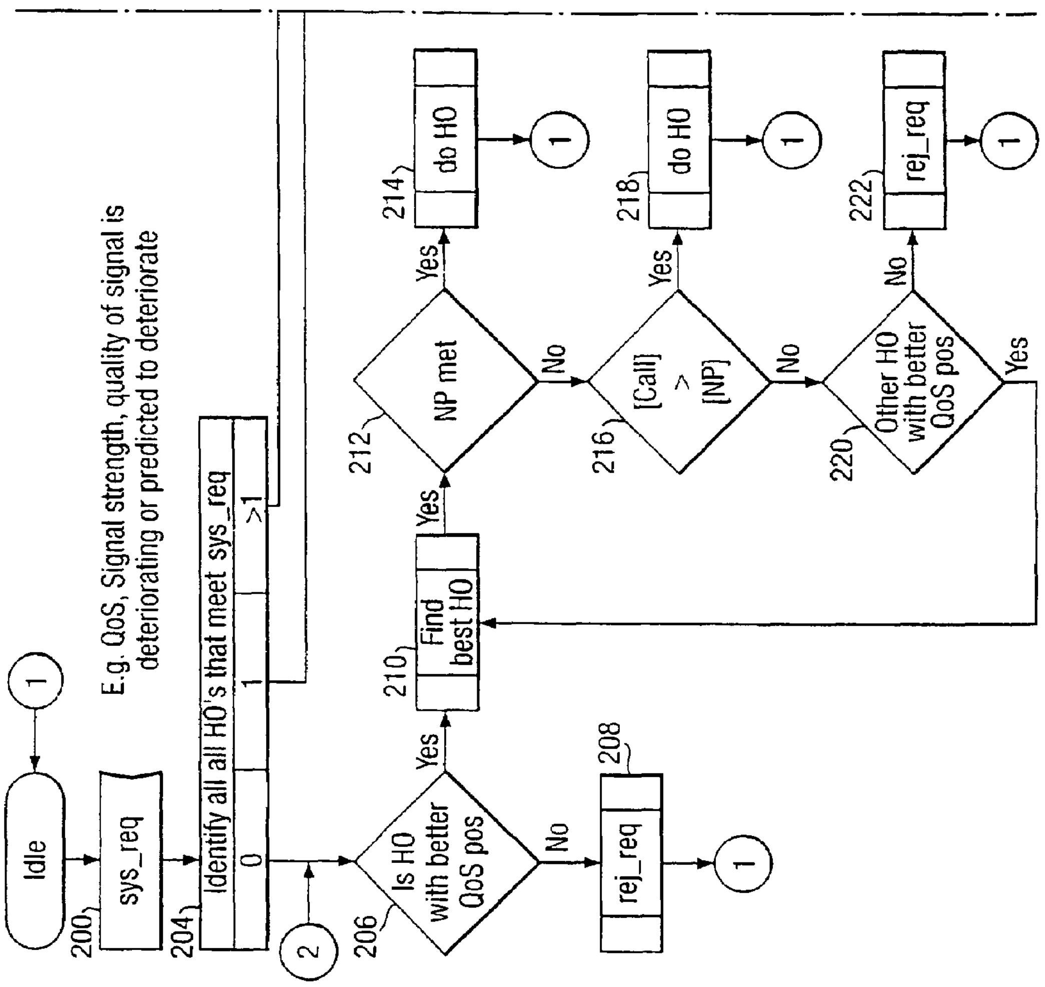
Figure 3:
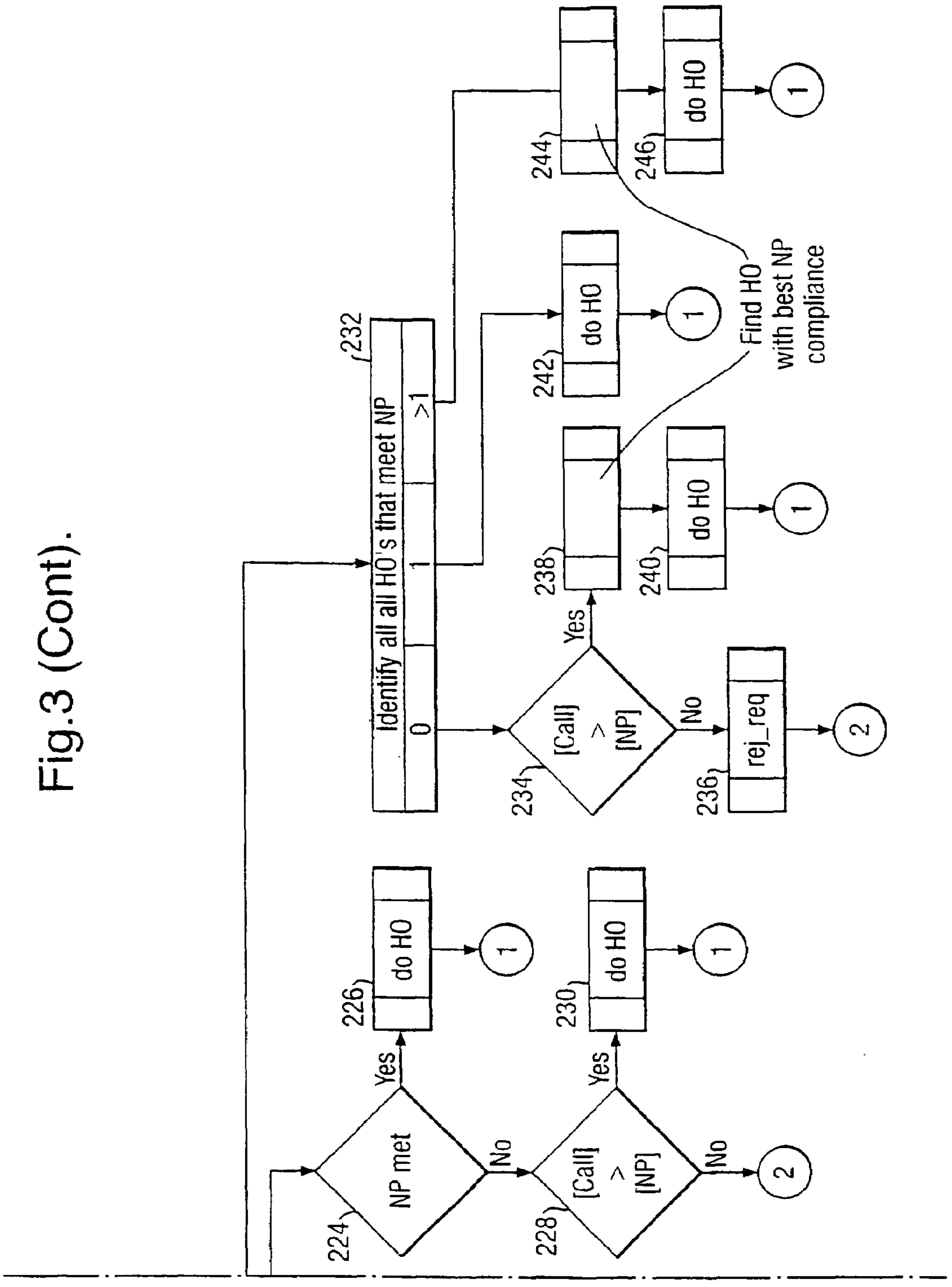

Referring now to FIG. 3, the handover trigger may be received by the handover manager 10 for call maintenance reasons. That is to say the quality of service (QoS), signal strength and/or quality of signal is deteriorating or predicted to deteriorate within the current radio access domain. In this case, the handover manager 10 receives a system request containing a handover trigger for a possible handover to a different radio access domain, step 200. The handover manager 10 first identifies all handovers that meet the system request and the current minimum requirements of the user, step 202. If no handovers meet the system request and these requirements, it is nevertheless checked in step 204 whether it is possible to handover and increase the quality of service from the current or predicted low quality of service to be received without handover, step 206. If no handover is available which provides such better QoS, the system request for handover is rejected, step 208. If, however, one or more handovers with better QoS are found to be possible in step 206, the best of those handovers is identified in step 210 and the best handover is tested against network policy in step 212. If network policy is met, the selected handover is executed, step 214. If network policy is not met, it is tested in step 216 whether the call is to be treated as of a higher priority than network policy considerations, step 216, and if so, the best handover is executed in any case, step 218. If the priority level allotted to the call is not higher than the network policy considerations, it is tested in step 220 whether or not another handover with better QoS than available or predicted without handover is possible, step 220. If not, the system request is rejected, step 222. If one or more other handovers are identified as being possible in step 220, processing returns to step 210.

If in step 204 a single handover is identified that meets the system request and current minimum user requirements, the handover manager 10 checks that network policy is met, step 224. If network policy is met, the handover is executed, step 226. If network policy is not met in step 224, it is tested in step 228 whether the call takes precedence over network policy, or at least those characteristics of network policy which are not met, and if so, the handover selected in step 204 is executed even though network policy is not met, step 230. If network policy takes precedence in step 228, processing proceeds to step 206.

If in step 204 more than one handover is identified which meets the system request and current minimum user requirements, the number of handovers that also meet network policy is identified in step 232. If none of the handovers identified in step 204 also meet network policy, it is tested in step 234 whether the priority level allotted to the call is greater than that of network policy, or at least the characteristics of the handover which do not meet network policy, step 234. If network policy takes precedence, the system request is rejected, step 236. If the call takes precedence, that of the plurality of handovers identified in step 204 having the best network policy compliance is identified in step 238, and the selected handover is executed in step 240.

If in step 232 a single handover is identified which also meets network policy, the selected handover is executed in step 242. If a plurality of handovers identified in step 232 to also meet network policy, the best handover, also taking account of the desired requirements of the user in addition to minimum requirements, is identified in step 244, and the appropriate handover is executed in step 246.

Figure 4:
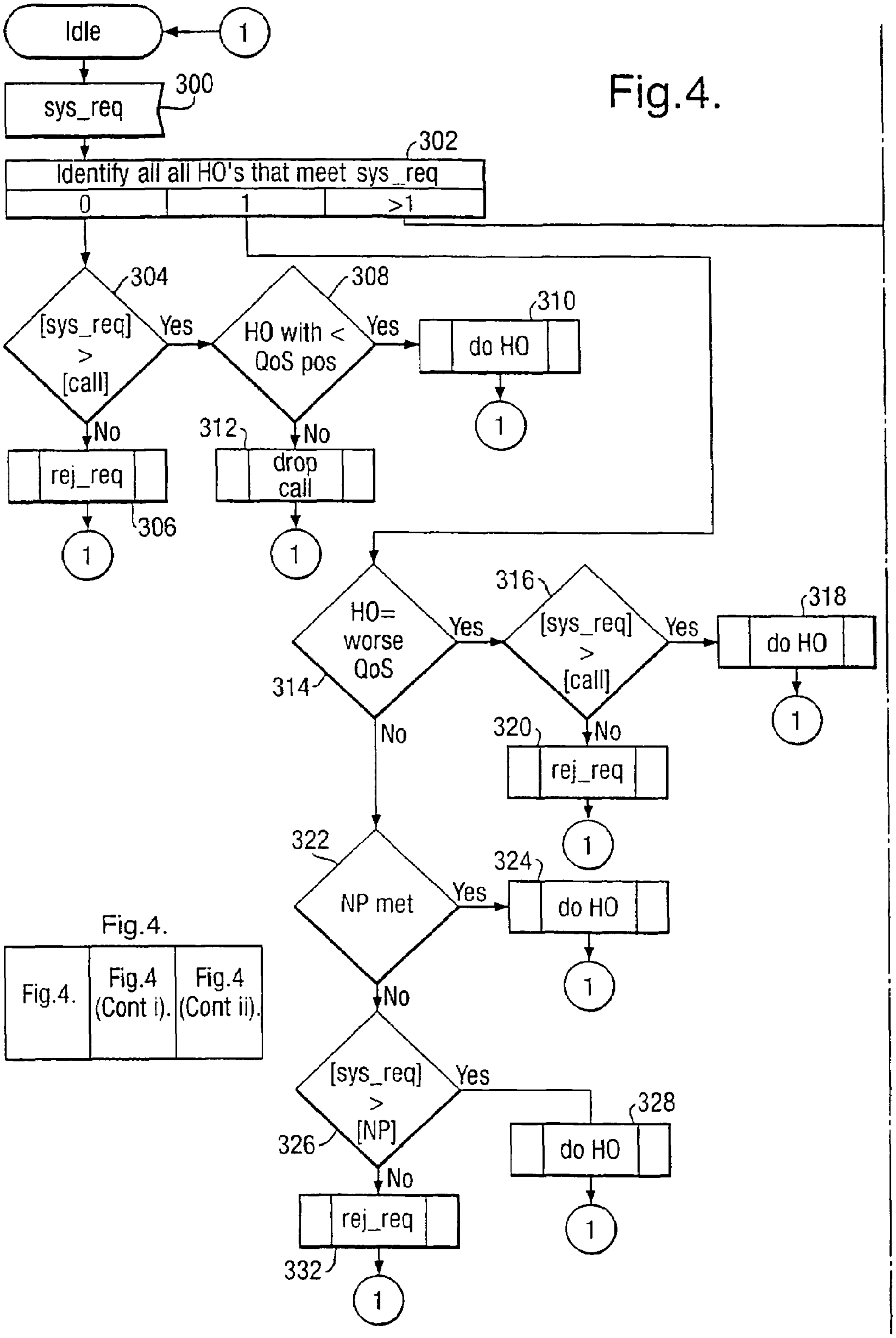

Referring now to FIG. 4, a handover trigger may be received by the handover manager for reasons other than user requests or call maintenance reasons. For example, the reason may be network maintenance reasons (e.g. the loading on a domain may be too great at a particular time). In this case, the handover manager 10 attempts to not only meet the system request, the current minimum requirements of the user and the network policy, but also to maintain QoS if possible.

On receipt of a system request generated in the current serving radio access domain for network reasons, step 300, all handovers meeting the system request and the current minimum requirements of the user are identified in step 302. If no handovers are available that meet these criteria, it is tested in step 304 whether system request has a higher priority than the call itself, step 304. If so, it is checked in step 308 whether a handover which meets the system request but does not meet current minimum user requirements, for a reason of a lower QoS, is nevertheless available, step 308. If so, the available handover is executed, step 310. If not, the call is forcibly dropped, step 312.

If a single handover is identified in step 302, it is tested in step 314 whether or not the handover would result in a worse QoS than that available without handover, step 314. If so, it is tested in step 316 whether or not the system request is of a higher priority level than that of the call itself. If so, the handover is executed in step 318 even though the resulting QoS is reduced. If the call takes precedence in step 316, the system request is rejected, step 320. If the handover identified in step 302 is one which would result in a similar, or higher, level of QoS, it is checked in step 322 whether network policy is met by the handover. If so, the selected handover is executed, step 324. If network policy is not met by the selected handover, it is checked in step 326 whether or not the system request is of a higher priority level than network policy, step 326. If so, the handover is executed, step 328. If not, the system request is rejected, step 332.

If in step 302, a plurality of handovers are identified as meeting the system request and current minimum user requirements, all of the identified handovers are analysed to identify whether or not QoS would be maintained or improved, step 334. If none of the identified handovers would maintain or improve QoS, it is checked in step 336 whether or not the system request has a higher level of priority than that of the call, and if not the system request is rejected, step 338. If however the system request takes precedence, that of the plurality of handovers identified in step 302 having the best predicted QoS is identified in step 340 The identified handover is then tested in step 342 as to whether or not network policy would be met by the handover, and if so, the handover is executed in step 344. If network policy is not met by the identified best QoS handover, the handover manager 10 tests whether or not the system request is of a higher level of priority than network policy, step 346. If so, the handover is executed even though network policy is not met, step 348. If however network policy takes precedence, a check is made as to whether or not more handovers are available, step 350. If no more handovers are available, the call is forcibly dropped, step 352. If more handovers are available, that with the next best predicted QoS is identified in step 354 and processing returns to step 342.

If in step 334 a single handover that at least maintains QoS as well as meeting the system request and current minimum user requirements is identified, the handover is tested to check whether or not network policy is met, step 356. If so, the selected handover is executed, step 358. If not, it is checked in step 360 whether or not network policy has a higher level of priority than the system request. If so, processing moves to step 340. If the system request takes precedence, the identified handover is executed, step 362.

If in step 334 a plurality of handovers are identified that at least maintain QoS as well as meeting the system request and current minimum user requirements all of those handovers that also meet network policy are identified in step 364. If none meet network policy, it is tested in step 366 whether or not the system request has a higher priority level than network policy. If so, that of the plurality of handovers identified in step 334 having the best network policy compliance is identified in step 370 and the selected handover is executed in step 372. If network policy takes precedence in step 366, the system request is rejected in step 368.

If a single handover is identified in step 364, that handover is executed, step 374.

If more than one handover is identified in step 364, a single handover is selected on the basis of all or the criteria already taken into consideration, along with any desired requirements of the user to identify a best handover. Network policy may also be taken into account in this step, 376, and once the best handover according to the selected criteria is identified in step 376, the selected handover is executed, step 378.

The handover manager 10 controls the execution of handover appropriate to the different types of radio access technologies involved. This may be performed, for example, by a handover agent. In a basic handover between two access nodes, the handover manager 10 may set up two separate connections to the mobile station, and bridge the connections to prevent loss of data during handover. Handover may also imply re-routine of connections through the fixed network, transferring associated control functions from one network node to another, and the initiation of new security transactions.

It will be appreciated that various modifications may be employed in relation to the above-described embodiments without departing from the scope of the invention, which is defined in the appended claims. It is to be mentioned that, whilst the above description relates to handover algorithms used for handover between different radio access technologies, similar algorithms may be used for other handovers. In general, the algorithms described above may be performed by a computer program on a computer-readable medium, and be used for handovers between access nodes/cells, channels, and radio access technologies as well as between mobile communications networks, and the term handover, and cognate terms, are to be understood to include handovers between any of these or any combination of these. For example, where access nodes serving different cells have different capabilities (whether in general or in respect of a particular mobile station involved in or to be involved in a particular communications session), handover between access nodes/cells may be initiated as a result of user or system requests. Similarly, where different channels of an access node have different properties, handover between channels may be initiated. In a frequency division system, handover between different frequency channels may be initiated to reduce interference, for instance. Similarly, in a time division system, handover between different time slots may be initiated and in a code division system, handover between different codes may be initiated. Furthermore, where different mobile communications networks have different capabilities (whether in general or in respect of particular access nodes of the networks, or a particular mobile station involved in or to be involved in a particular communications session), handover between networks may be initiated. For example, handover from one network to another network, between which a roaming agreement exists, may be initiated as a result of a user or system request where QoS requirements will be better met as a result. For a further example, a service provider or virtual service provider may require handover between two networks which provide it with network services to minimize cost.

The advantages of using handover algorithms which take network policy and user preferences or requirements as separate considerations, and do not require modification when network policy and/or user preferences or requirements alter, also apply in this case.

It will be understood by those of skill in the art that numerous and various modifications can be made without departing from the spirit of the present invention. Therefore, it should be clearly understood that the forms of the invention are illustrative only and are not intended to limit the scope of the invention.

What is claimed is:

1. A method of controlling handover of a mobile station conducting a communications session in a mobile communications network, the network including a plurality of radio access domains, each having a radio access technology associated therewith, the method comprising:

receiving a trigger from the mobile station indicating a requirement for handover, wherein said requirement specifies a change in radio access technology requirements;

testing at least one possible handover meeting said requirement for handover against network policy; and controlling handover in accordance with said requirement for handover and said network policy, wherein the requirement for handover is an application requirement, and wherein the application requirement is a user request requirement related to at least one of the plurality of radio access domains.

2. A method according to claim 1, wherein data defining said network policy is accessible to a network entity controlling handover.

3. A method according to claim 1, comprising assigning a priority to said requirement for handover, assigning a priority to network policy, and controlling handover in accordance with a relationship between said priorities.

4. A method according to claim 1, comprising assigning a priority to the communications session, assigning a priority to network policy, and controlling handover in accordance with a relationship between said priorities.

5. A method according to claim 1, wherein said requirement for handover is a user-specified requirement.

6. A method according to claim 1, wherein said requirement for handover is an application requirement, and wherein said application requirement is unrelated to radio signaling quality.

7. A method according to claim 1, comprising not conducting handover if, whilst one or more handovers meeting said requirement for handover exist, no handover exists meeting network policy.

8. A method according to claim 1, comprising conducting handover in accordance with quality of service requirements in addition to network policy and said requirement for handover.

9. A method according to claim 1, comprising conducting handover in accordance with quasi-static user-specified preferences in addition to network policy and said requirement for handover.

10. A method according to claim 1, comprising altering network policy with time in order to alter the radio access characteristics of communications sessions conducted by mobile stations operating in the mobile communications system, under the control of a network operator.

11. A method according to claim 1, wherein said handover required or controlled involves handing over the mobile station between said radio access domains.

12. An apparatus for a mobile communications network, the mobile communications network comprising a plurality of radio access domains, each having a radio access technology associated therewith, the apparatus configured to communicate with a plurality of radio access domains, the apparatus further configured to:

receive a trigger from the mobile station indicating a requirement for handover, wherein said requirement specifies a change in radio access technology requirements;

test at least one possible handover meeting said requirement for handover against said network policy; and control handover in accordance with said requirement for handover and said network policy, wherein the requirement for handover is an application requirement, and wherein the application requirement is a user request requirement related to at least one of the plurality of radio access domains.

13. A computer-readable medium encoded with a program for performing a method of controlling handover of a mobile station conducting a communications session in a mobile communications network, the network including a plurality of radio address domains, each having a radio access technology associated therewith, the method comprising:

receiving a trigger from the mobile station indicating a requirement for handover, wherein said requirement specifies a change in radio access technology requirements;

testing at least one possible handover meeting said requirement for handover against network policy; and controlling handover in accordance with said requirement for handover and said network policy, wherein the requirement for handover is an application requirement, and wherein the application requirement is a user request requirement related to at east one of the plurality of radio address domains.

* * * * *